Sept. 21, 1954　　　　　E. F. BROWN　　　　　2,689,494
BICYCLE FORK BENDING TOOL
Filed July 21, 1952

Erving F. Brown
INVENTOR.

Patented Sept. 21, 1954

2,689,494

UNITED STATES PATENT OFFICE 2,689,494

BICYCLE FORK BENDING TOOL

Erving F. Brown, Horseheads, N. Y.

Application July 21, 1952, Serial No. 300,011

1 Claim. (Cl. 81—15)

The present invention relates to a novelly constructed tool which is expressly but not necessarily adapted to be used by a workman in a bicycle shop, said tool being especially well designed and effectively adapted to work on and bend and thus repair either the bicycle fork or crank portions of the foot pedals.

An object of the invention, generally speaking, is to structurally, functionally and otherwise improve upon hand tools used for bending and reshaping purposes and in doing so to provide one which is comparatively simple, practical, economical, sturdy, easy to use and therefore one which aptly fulfills the requirements of manufacturers and users alike.

A further object of the invention, also in general terms, is to improve upon and reduce the number of parts entering into the combination thereby not only increasing the efficiency of the structure as a whole but also rendering the same less costly to manufacture and to otherwise simplify factors of assembling and sale.

Briefly, the preferred embodiment of the invention has to do with a sturdy linearly straight member which serves as a lever, there being a block-like head pivoted on the pressure exerting end of the lever and said head lending itself properly to the part against which it is forcibly brought to serve as a thrust element. A collar is slidably mounted on the lever and is pivotly connected with a clevis which is encircled about one of the fork arms and is shackled to the collar by way of the pivot connection.

It is also an object of the invention to provide a tool having the aforementioned characteristics and through the medium of which bicycle crank arms can be straightened by putting of the same in a vise or, if preferred, by leaving the crank in place on the hub structure and removing the usually provided foot pedals.

In addition novelty is predicated on a lever one end of which is provided with a shoulder and which is preferably cylindrical in cross-section and which may be used to remove the bulges from the tubular fork stem, this by sliding the handle into the bore or passage and using it as an anvil so that by tapping the portions of the stem with a hammer necessary bends and bulges can be removed and the stem restored to its original shape.

Further objects and advantages will become more readily apparent from the following description and the accompanying sheet of illustrative drawings.

In the drawings wherein like numerals are employed to designate like parts throughout same:

Figure 1:
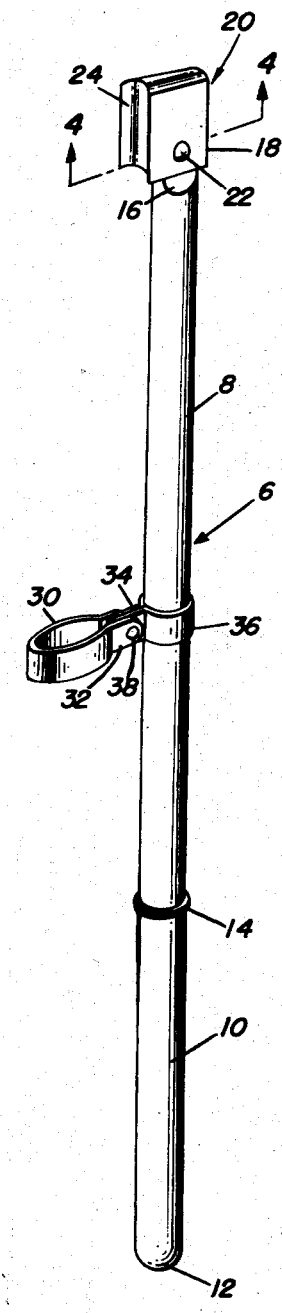
Figure 1 is a perspective view of a fork straightening tool constructed in accordance with the principles of the present invention.

Referring now to the drawings by way of reference numerals and accompanying lead lines the lever, as a unit, is denoted by the numeral 6 and comprises an elongated tubular member the portion 8 of which may be called the lever and the portion 10 of which may be called the handle. The outer end of the handle is rounded and blunt as at 12 and an annular shoulder is provided at 14. The outer end of the lever is flattened as at 16 and is fitted between sidewall portions 18—18 of the block-like thrust producing head 20. The head is pivotly or hingedly connected to the flattened shank 16 as at 22. One marginal side of the head is formed with a groove 24 which is conformable to the surface of the fork arms 26 of the bicycle fork unit 28 much in the manner shown in Figure 2. This head is therefore more or less self-pivoting and self-adjusting.

Figure 3:
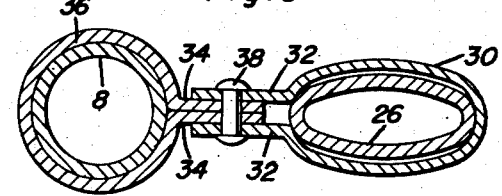
Figure 3 is a horizontal section on an enlarged scale on the line 3—3 of Figure 2, looking in the direction of the arrows.
Figure 4:
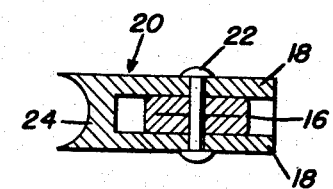
Figure 4 is a similar section taken on the line 4—4 of Figure 1, looking in the direction of the arrows.

The adapter which is used for affording a suitable operating connection between the lever and the forked arm 26 may be best identified as a saddling clevis 30. This is substantially oval in plan as shown in Figure 3 so that it properly embraces the fork arm. It is of split form and the split ends 32—32 provide ears which straddle similar ears 34—34 on a sliding coupling or collar 36. The shackling and pivoting pin which passes between the respective ears 32 and 34 is denoted by the numeral 38. Here the collar slides back and forth on the lever so that it has the most desirable position for accurate leverage for pivoting of the lever in relation to the fork arms. The handle portion is maneuvered in an obvious manner to exert pressure on the block and to use the block for bending and reshaping purposes.

As before stated bicycle crank arms can be straightened by way of the tool and an assisting vise. As a matter of fact, it is possible to use the tool satisfactorily even if the crank is left in position and the usual pedals are removed to make way for proper attachment of the tool.

Figure 2:
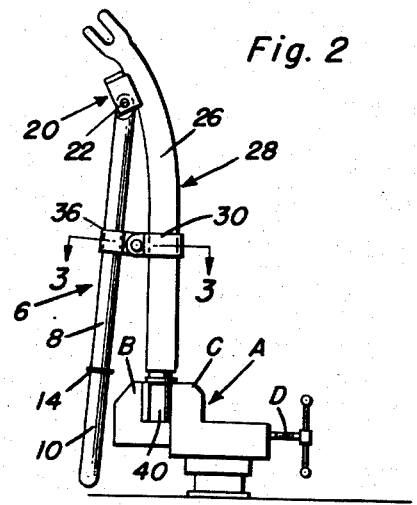
Figure 2 is an elevational view showing the manner in which the bicycle fork is removed, placed in the jaws of a vise and how the tool is employed in connection therewith.

In Figure 2 the general mode of operation is shown wherein the vise is denoted at A the same having jaws B and C and operating means D.

The hollow tubular stem 40 is placed in the jaws of the vice and the oval clevis is slipped over one of the arms 26 and the block is placed against the arm and the lever is used in an obvious manner by employing the portion 10 as a handle.

The handle 10 can be used to take the bulge out of a forked stem, that is stem 40 by simply sliding the handle into the passage or bore of the stem and using the handle as an anvil and then employing a hammer and thus tapping or otherwise impacting the bends or irregularities with a hammer. This is another one of those cases in which novelty is predicated on the tool more than the various modes and manners of using the same. Like many other tools different persons will employ the same for various purposes and will also resort to slightly varying adjustments and techniques. It is submitted therefore that the novelty has to do with the structure herein shown and specifically described.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A tool for use in a bicycle repair shop comprising a lever having a handle at one end, a block having a grooved marginal edge adapted to bear against a fork arm or the like, one marginal edge portion of said block having spaced wall members providing a socket, said lever telescoping into and terminating in said socket between said wall members, a connecting and hinging pin passing through said wall members and terminal end portion of said lever and providing a non-slidable hinging connection, a collar slidable back and forth on said lever and provided with outstanding ears and a clevis adapted to embrace a forked arm, said clevis having ears and said clevis ears and collar ears being overlapped and hingedly connected with each other.

References Cited in the file of this patent

UNITED STATES PATENTS

| Number | Name | Date |
|---|---|---|
| 1,813,012 | Asher | July 7, 1931 |
| 1,909,284 | Kuhn | May 16, 1933 |
| 2,191,720 | Meinhardt | Feb. 27, 1940 |
| 2,302,279 | Waller | Nov. 17, 1942 |
| 2,351,858 | Ingalls | June 20, 1944 |
| 2,402,877 | Dial | June 25, 1946 |
| 2,440,536 | Begley | Apr. 27, 1948 |